United States Patent
Hara et al.

(10) Patent No.: US 9,293,156 B2
(45) Date of Patent: *Mar. 22, 2016

(54) SUBSTRATES FOR THIN-FILM MAGNETIC HEADS, MAGNETIC HEAD SLIDERS, AND HARD DISK DRIVE DEVICES

(71) Applicants: NIPPON TUNGSTEN CO., LTD., Fukuoka-shi, Fukuoka (JP); HITACHI METALS, LTD., Minato-ku, Tokyo (JP)

(72) Inventors: Yusuke Hara, Fukuoka (JP); Shinzoh Mitomi, Fukuoka (JP); Shigeru Matsuo, Fukuoka (JP); Hidetaka Sakumichi, Kumagaya (JP)

(73) Assignees: NIPPON TUNGSTEN CO., LTD., Fukuoka (JP); HITACHI METALS, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/752,157

(22) Filed: Jun. 26, 2015

(65) Prior Publication Data

US 2015/0380025 A1    Dec. 31, 2015

(30) Foreign Application Priority Data

Jun. 30, 2014    (JP) .................................. 2014-134420

(51) Int. Cl.
G11B 21/21 (2006.01)
G11B 5/10 (2006.01)
G11B 5/105 (2006.01)
G11B 5/60 (2006.01)

(52) U.S. Cl.
CPC . *G11B 5/10* (2013.01); *G11B 5/105* (2013.01)

(58) Field of Classification Search
None
See application file for complete search history.

(56) References Cited

U.S. PATENT DOCUMENTS

| 5,595,946 A | 1/1997 | Tsujimoto et al. |
| 6,333,103 B1 * | 12/2001 | Ishii .................... C23C 16/0272 428/701 |
| 7,939,181 B2 * | 5/2011 | Ramm ................ C23C 14/0021 428/701 |
| 2010/0061013 A1 | 3/2010 | Nakazawa et al. |
| 2010/0315743 A1 | 12/2010 | Wang et al. |

FOREIGN PATENT DOCUMENTS

| JP | 02-141467 | 5/1990 |
| JP | 08-034662 | 2/1996 |
| JP | 2008-084520 | 4/2008 |
| JP | 2009-110571 | 5/2009 |
| JP | 2009-120428 | 6/2009 |
| WO | WO 2008-056710 A1 | 5/2008 |

* cited by examiner

*Primary Examiner* — Craig A. Renner
(74) *Attorney, Agent, or Firm* — Nixon Peabody LLP; Jeffrey L. Costellia (57) ABSTRACT

An AlTiC-based substrate suitable for a thin-film magnetic head is provided. The $Al_2O_3$—TiC based substrate for a thin-film magnetic head including an $Al_2O_3$ phase and a TiC phase, wherein a c-axis lattice constant of the $Al_2O_3$ phase is 12.992 Å or more and 12.998 Å or less, and a lattice constant of the TiC phase is 4.317 Å or more and 4.325 Å or less.

5 Claims, 4 Drawing Sheets

FIG.1A

ROTATIVE DIRECTION

*FIG.4* c-AXIS LATTICE CONSTANT (Å) OF ALUMINA PHASE

*FIG.5*

SUBSTRATES FOR THIN-FILM MAGNETIC HEADS, MAGNETIC HEAD SLIDERS, AND HARD DISK DRIVE DEVICES

BACKGROUND OF THE INVENTION

1. Technical Field

The present invention relates to a substrate for a thin-film magnetic head utilized for a magnetic head slider of a hard disk drive device.

2. Description of the Related Art

Recently, the information content of multimedia data is increasing more and more in association with the requirements of higher definition for video and the like. In addition, it is required for the capacity of an information recording device for recording such video to increase. Hard disk drives are information recording devices used as data storing devices of personal computers, recording devices connected to television sets, and the like. For such a hard disk drive device, it is required to increase the capacity thereof and to minimize the size thereof.

Figure 1A:
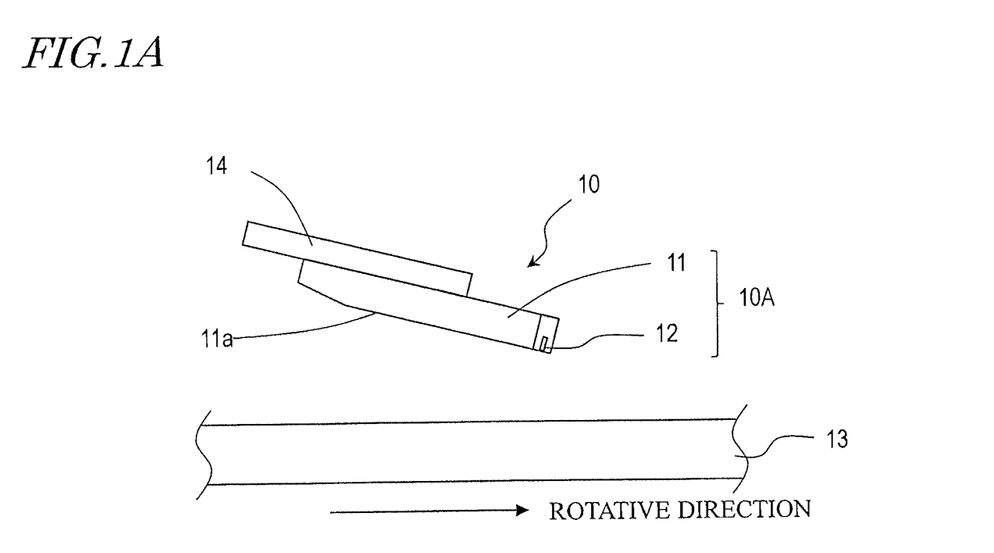
FIG. 1A and FIG. 1B are a side view and a perspective view of a magnetic head, respectively.

FIG. 1A schematically shows a thin-film magnetic slider assembly 10 and a disk (a platter) 13 as a magnetic recording medium included in a general hard disk drive device (hereinafter, sometimes referred to as an HDD). As shown in FIG. 1A, a slider 10A held by a gimbal 14 includes a base portion 11 and a reading element and a writing element 12 (hereinafter sometimes simply referred to as a transducer 12) provided on one end portion of the base portion 11. A unit held by the gimbal 14 is referred to as a head slider, or sometimes simply referred to as a slider.

The writing element of the transducer 12 is formed from a magnetic material. A coil is wound on the inside of a ring, and a magnetic field is generated in the writing element by applying a recording signal to the coil. In this way, data is written onto a disk 13. On the other hand, the reading element as a reproducing head is a magneto-resistive (MR or GMR) effect element, a tunneling magneto-resistive (TMR) effect element, or the like for converting the variation in magnetic field into the variation of electric resistance. The reading element reads magnetic data recorded on the disk 13, and converts the data into electric signals.

The substrate 11 for holding the transducer 12 was often formed by an $Al_2O_3$—TiC-based ceramic sintered body. This is because $Al_2O_3$—TiC (hereinafter abbreviated to AlTiC) is superior and well-balanced in respect of the thermal property, the mechanical property, and the workability.

In order to increase the storage capacity of HDD, it is required to increase the recording density of the disk 13. Currently, the recording density of HDD reaches about 750 Gbit/square inch. In order to accurately realize the writing/reading operation in such a situation of high recording density, the gap between the transducer 12 and the disk 13 during the operation is preferably small. At present, the gap is as small as 10 nm or less.

In association with the smaller size and the larger capacity of a hard disk drive device, the floating height of the thin-film magnetic head from the disk is low, and a higher degree of surface roughness is required for the air bearing surface (ABS) 11a of the slider of the thin-film magnetic head. The ABS 11a is a surface of the base portion 11 facing to the disk 13 in the slider. The shape thereof is designed such that the ABS 11a is caused to stably float by an appropriate distance from a disk surface due to air flow generated by the rotation of the disk 13 (see, FIG. 1B).

Figure 1B:
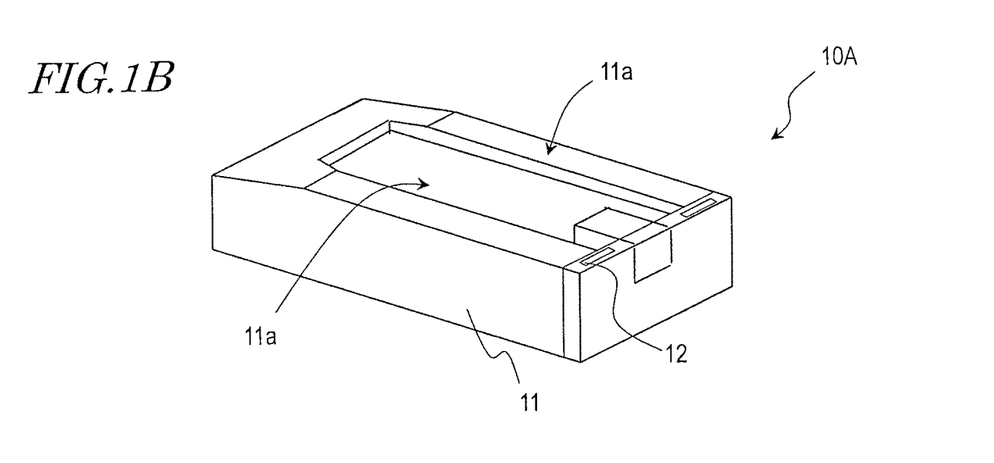

In order to realize the desired shape of the ABS, the base portion 11 is required to have a property to be accurately worked at a nano-level. In general, the base portion 11 is first worked to be flat via a lapping step (a grinding step with a lapping apparatus), and then worked to have the shape with which the above-mentioned air flow can be appropriately utilized by using a dry etching method such as ion milling, ion beam etching, or other methods. In the condition after the above-mentioned lapping step, the worked surface of the base portion 11 is preferably an extremely smooth flat plane.

The gap between the disk 13 and the transducer 12 during the operation may be varied by a factor other than the smoothness of the base portion 11. Hereinafter such a factor will be exemplarily described.

Figure 2A:
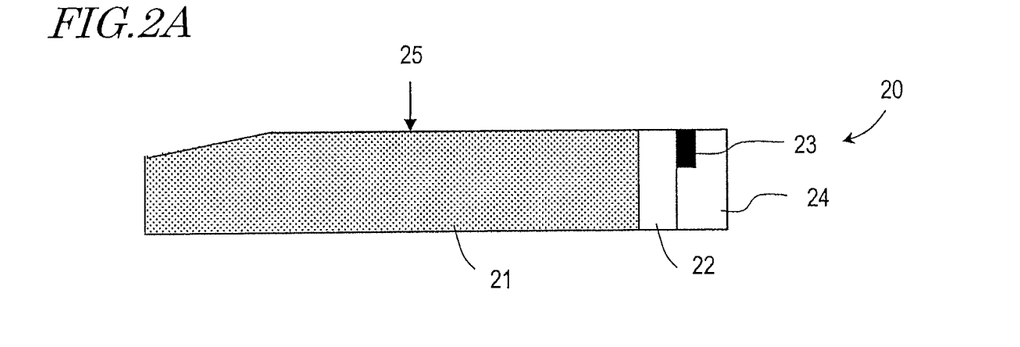
FIG. 2A and FIG. 2B are views showing a magnetic head in another embodiment.
Figure 2B:
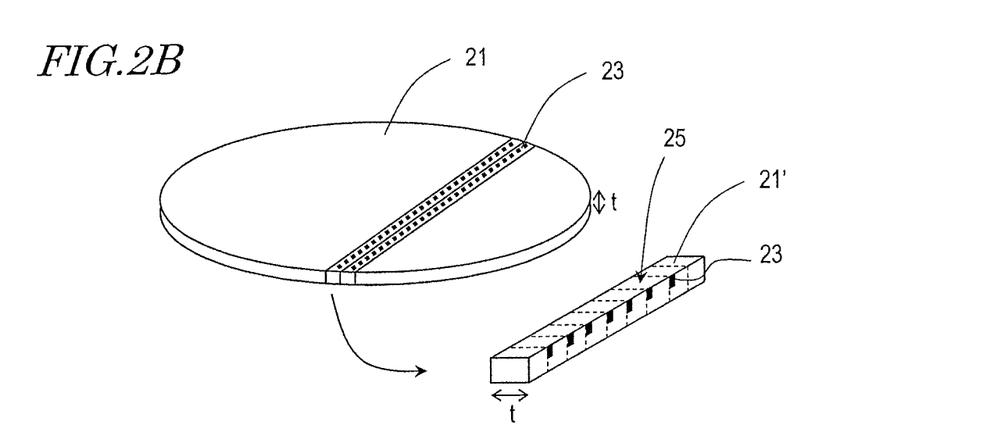

As shown in FIG. 2A and FIG. 2B, the thin-film magnetic head (the slider) 20 is formed by laminating, for example, an AlTiC substrate (the base portion) 21, an $Al_2O_3$ film 22, a transducer 23, and an $Al_2O_3$ film 24. The $Al_2O_3$ films 22 and 24 are typically amorphous alumina. When a thin-film magnetic head 20 is manufactured, a plane 25 which will be an ABS (corresponding to the cut-out plane obtained by cutting the substrate 21 having a thickness t into rod-like bodies 21' as shown in the lower right portion of FIG. 2B) is first polished to be flat. The plane 25 which will be the ABS (hereinafter referred to as an ABS forming plane) corresponds to a sectional plane of the lamination including the AlTiC substrate 21, the $Al_2O_3$ films 22 and 24, and the transducer 23.

In the ABS forming plane 25, since the AlTiC substrate 21, the $Al_2O_3$ films 22 and 24, and the transducer are exposed, the difference in hardness among these elements becomes a problem when the ABS forming plane 25 is polished. The Vickers hardnesses Hv of the $Al_2O_3$ phase and the TiC phase of the AlTiC substrate 21 is 2000 or more, respectively. The Vickers hardnesses Hv of the amorphous $Al_2O_3$ films 22 and 24, and the transducer 23 (metal) are 700 to 900, and 100 to 300, respectively.

Accordingly, if the ABS forming plane 25 is polished so that the polishing amount of the surface of the AlTiC substrate 21 (especially TiC phase) as the main constituting portion of ABS is optimum, the $Al_2O_3$ films 22 and 24, and the transducer 23 having lower hardnesses than the TiC phase are excessively polished. As a result, in the ABS forming plane 25 which is to be flat, the portion corresponding to the $Al_2O_3$ films 22 and 24 is lower than the portion corresponding to the AlTiC substrate 21, and the portion corresponding to the transducer 23 is disadvantageously further lower than the portion.

Generally, the step difference is referred to as a pole tip recession (hereinafter abbreviated to "PTR"). Due to the generation of the PTR, an extra gap is formed between the transducer and the magnetic recording medium. This may prevent the increase in recording density and the increase of capacity of the hard disk drive.

As described above, in order to increase the recoding density of HDD, it is required that the distance between the slider and the disk during the operation is controlled as precisely as possible. For example, WO2008/056710 describes a technique in which the organization of an AlTiC substrate manufactured as a sintered body is appropriately formed, so that the mechanical workability can be improved. When an AlTiC substrate with such superior workability is used, a magnetic head with high shape accuracy can be manufactured. Thus, the floating amount of the magnetic head with respect to the disk can be controlled with high accuracy.

One of planes of a slider base portion formed from an AlTiC substrate is subjected to dry etching such as ion beam etching or RIE (reactive ion etching) so as to have the shape of ABS. In the dry etching step, if there are phases of which the etching rates are different, there may sometimes arise a problem that the surface roughness after the dry etching is drastically deteriorated. For example, even if the etching amounts of the $Al_2O_3$ phase and the TiC phase included in the AlTiC substrate can be uniform, in the case where an $Al_2TiO_5$ phase (an aluminum titanate phase) is generated as a third phase, the etching amount is not uniform. As a result, the surface roughness after the dry etching is sometimes drastically deteriorated.

In the case where the size of a slider is small, when a current flows through a coil which constitutes the transducer, there arises a problem that the quantity of heat generated per unit volume may increase. In this case, the reading element and the writing element are caused to expand due to heat, so as to protrude toward the magnetic recording medium. As described above, the gap between the transducer and the disk during the operation is set to be only about 10 nm, so that the transducer caused to expand may disadvantageously come into contact with the magnetic recording medium.

Such a problem is called as TPTR (Thermal Pole Tip Recession) and is caused by a difference between the coefficient of thermal expansion of the AlTiC substrate portion and the coefficient of thermal expansion of the metal portion constituting the transducer. As a result, during the operation, the transducer comes closer to the side of the disk than expected. The TPTR may easily occur when the thermal conductivity of the slider substrate is small and it is difficult for the heat to escapes. In the case where the transducer is damaged by the contact with the magnetic recording medium due to the TPTR, there arises a serious trouble that the hard disk drive device does not function.

Even when the transducer does not come into contact with the magnetic recording medium, the gap between the magnetic recording medium and the transducer varies due to the thermal expansion of the transducer. For example, when the transducer expands by several nanometers, the gap between the magnetic recording medium and the transducer varies by 10% or more. Accordingly, the writing characteristics and the reading characteristics are largely changed, and some error occurs in the signal written into the magnetic recording medium or the signal read out from the magnetic recording medium.

The smoothness is also important in the ABS formed by dry etching. In order to reduce the variation in surface roughness of the ABS obtained by working the shape of the plane after the lapping step, it is preferred to decrease minute pores (micropores) included in the AlTiC substrate. The technique for decreasing minute pores in the substrate is described in WO2008/056710. WO2008/056710 describes that, in the case where the lattice constant of the TIC of the AlTiC substrate is relatively uniform, the minute pores can be decreased.

As described above, various characteristics are required for the AlTiC substrate for a thin-film magnetic head. Especially there was a problem that the occurrence of defect caused by the protrusion of the transducer due to TPTR should be suppressed. In addition, there was another problem that the micropores generated in the substrate is suppressed, so as to obtain ABS having a smooth surface with small variation in roughness. In the case where the variation in surface roughness of ABS is small, the head floating amount during the operation can be stably small. Accordingly, the recording density of HDD can be improved.

The present invention has been conducted in view of the above-mentioned problems. It is an objective of the present invention to provide an AlTiC substrate for a thin-film magnetic head with superior smoothness of ABS by suppressing the occurrence of defect due to TPTR and suppressing the generation of micropores, and to provide a slider and an HDD using the substrate.

SUMMARY OF THE INVENTION

An $Al_2O_3$—TiC based substrate for a thin-film magnetic head in one embodiment of the present invention includes an $Al_2O_3$ phase and a TiC phase, wherein a c-axis lattice constant of the $Al_2O_3$ phase is 12.992 Å (1.2992 nm) or more and 12.998 Å (1.2998 nm) or less, and a lattice constant of the TiC phase is 4.317 Å (0.4317 nm) or more and 4.325 Å (0.4325 nm) or less.

In one embodiment, the lattice constant of the TiC phase is 4.318 Å (0.4318 nm) or more and 4.325 Å (0.4325 nm) or less.

In one embodiment, the c-axis lattice constant of the $Al_2O_3$ phase is 12.992 Å (1.2992 nm) or more and 12.995 Å (1.2995 nm) or less, and the lattice constant of the TiC phase is 4.320 Å (0.4320 nm) or more and 4.325 Å (0.4325 nm) or less.

A magnetic head slider in one embodiment of the present invention is configured by using one of the above-mentioned $Al_2O_3$—TiC based substrates for a thin-film magnetic head.

A hard disk drive device in one embodiment of the present invention is provided with the above-mentioned magnetic head slider.

According to the present invention, a substrate for a thin-film magnetic head with higher thermal conductivity, and having a smooth ABS by suppressing the generation of micropores. A magnetic head slider manufactured by using such a substrate can more accurately control the floating amount from a disk and can prevent defects due to TPTR during the operation from occurring. Accordingly, the present invention can contribute to the size reduction and the increase of capacity of HDD.

BRIEF DESCRIPTION OF THE DRAWINGS

The foregoing summary as well as the following detailed description of the preferred embodiments of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

DETAILED DESCRIPTION OF PREFERRED EMBODIMENTS

Hereinafter, preferred embodiments of the present invention will be described with reference to the accompanying drawings. However, the present invention is not limited to those described below.

A substrate for a thin-film magnetic head according to an embodiment of the present invention is an $Al_2O_3$—TiC-based substrate (hereinafter referred to as an AlTiC substrate) including an $Al_2O_3$ phase and a TiC phase. In the AlTiC substrate of this embodiment, typically, the $Al_2O_3$ phase constitutes a matrix phase, and an organization in which the TiC phase is dispersed in the $Al_2O_3$ matrix phase is formed.

Herein the $Al_2O_3$ phase is a phase constituted by an $Al_2O_3$ crystal and a crystal in which other element is substituted for part of elements constituting the $Al_2O_3$ crystal. The TiC phase is a phase constituted by a TiC crystal and a crystal in which other element is substituted for part of elements constituting the TiC crystal.

It is noted that the $Al_2O_3$ phase and the TiC phase can be easily identified, for example, by observation with an optical microscope or SEM (scanning electron microscope), or the like. In the thus-identified $Al_2O_3$ phase and the TiC phase, a lattice constant of the $Al_2O_3$ phase and a lattice constant of the TiC phase are obtained by using X-ray diffraction as described later.

Herein in the substrate for the thin-film magnetic head of this embodiment, the c-axis lattice constant of the $Al_2O_3$ phase is set to be 12.992 Å or more and 12.998 Å or less. The $Al_2O_3$ (aluminum oxide (III)) may sometimes be referred to as alumina (α-alumina) in general. Also in this specification, $Al_2O_3$ may sometimes be referred to as alumina.

In this specification, the lattice constants of the alumina phase and the TiC phase may not necessarily be completely uniform in the AlTiC substrate, but may be slightly different depending on measured points. In such a case, an average of values obtained by the measurements of several or more different points of the substrate may be regarded as a lattice constant in the AlTiC substrate.

Figure 3A:
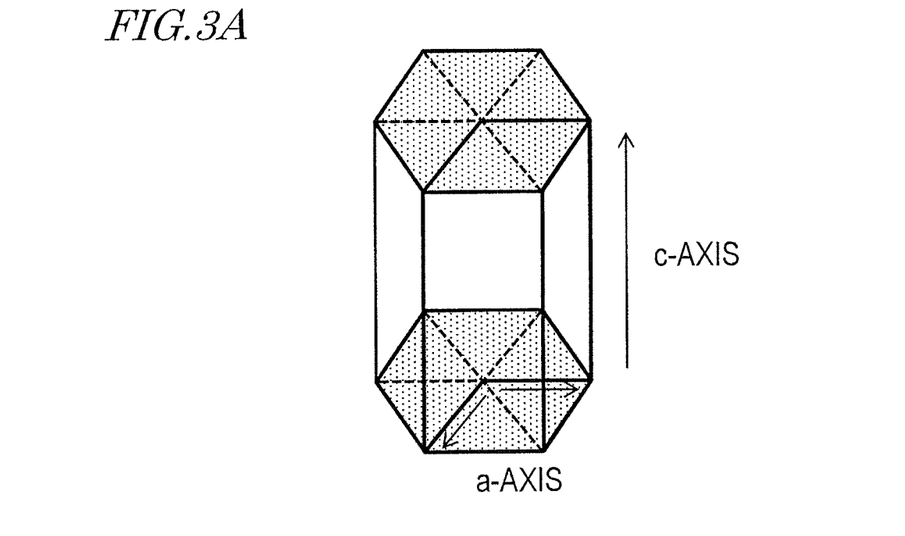
FIG. 3A is a perspective view of a crystal structure of alumina.
Figure 3B:
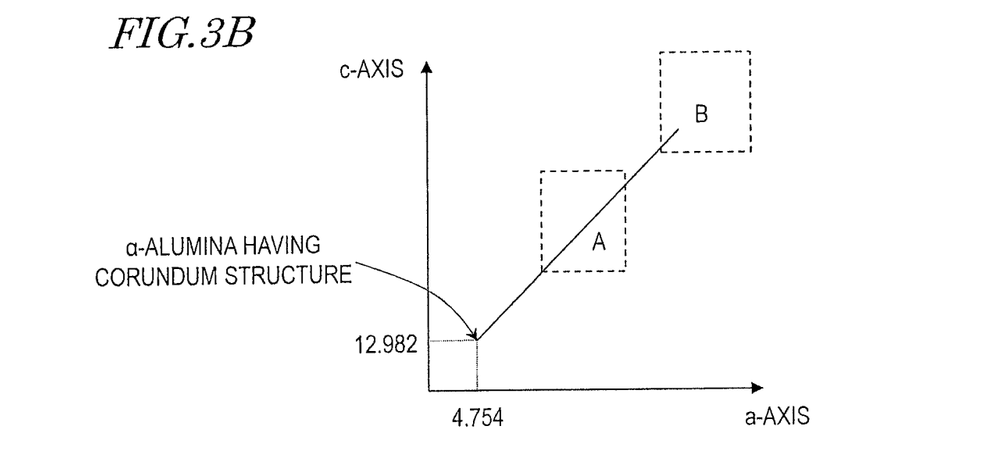
FIG. 3B is a graph showing lattice constants (a-axis and c-axis) of reference data of α-alumina (Region A: powder condition used as a material, and Region B: an $Al_2O_3$ phase in the condition after the sintering of AlTiC), respectively.

The lattice constant of the alumina phase will be described below. The alumina crystal has a crystal structure of trigonal system. As shown in FIG. 3A, the crystal structure approximates pseudo hexagonal crystal, so that lattice constants can be shown along a-axis and c-axis. As shown in FIG. 3B, it is known that in the α-alumina having a corundum structure, the a-axis lattice constant is 4.754 Å, and the c-axis lattice constant is 12.982 Å.

As shown as the region A of FIG. 3B, in the alumina material powder for manufacturing the AlTiC substrate, the a-axis and c-axis lattice constants are larger, respectively. It is considered that this is a phenomena which occurs due to remaining impurity elements such as Na, Mg, and Ca other than Al and O in the process of producing alumina material powder from mineral ore. The atomic radii of such elements are larger than that of Al, so that as the impurity elements are more substituted, the size of crystal lattice tends to increase.

In some cases, the AlTiC substrate may be manufactured with higher sintering property by performing the sintering step while adding MgO, $Y_2O_3$, or the like as sintering aid to alumina and TiC in material powder condition, which will be described later. When the sintering aid is added in such a way, some other element is substituted for part of Al atoms in the sintering step. As a result, in the manufactured AlTiC substrate, the lattice constants along a-axis and c-axis of the $Al_2O_3$ phase in the AlTiC substrate may sometimes be much larger, as shown in the region B of FIG. 3B.

As described above, the lattice constant of the $Al_2O_3$ phase in the AlTiC substrate may be varied depending on various factors in the production process. Thus, the inventors of this invention focused on the c-axis lattice constant of the $Al_2O_3$ phase which has not been examined, and earnestly performed experiments and investigation about the influence of the c-axis lattice constant of the $Al_2O_3$ phase on the formation of ABS and the suppression of TPTR in the AlTiC substrate utilized as a magnetic head slider. In addition, they also focused on the lattice constant of the TiC phase, and earnestly performed experiments and investigation about the influence of the combination with the c-axis lattice constant of the $Al_2O_3$ phase on the formation of ABS and the suppression of TPTR.

As a result, as described above, it was found that in the case where the c-axis lattice constant of the $Al_2O_3$ phase was set in the range of 12.992 Å or more and 12.998 Å or less, and the lattice constant of the TiC phase was set to be 4.317 Å or more and 4.325 Å or less, micropores generated in the AlTiC substrate after sintering was suppressed, and ABS with more smooth surface could be formed. In addition, as described above, it was found that if the c-axis lattice constant of the $Al_2O_3$ phase and the lattice constant of the TiC phase were set, the occurrence of detect due to TPTR could be more surely prevented. Herein the TiC crystal is a crystal of NaCl type (cubic system), and the lattice constants in respective directions in the crystal have the same numeral value (i.e. a value represented as an a-axis lattice constant). In this specification, the lattice constant of the TiC phase indicates the above-mentioned value.

In the case where the lattice constant of the TiC phase in the AlTiC substrate is in the range of 4.317 Å to 4.325 Å, the number of micropores can be reduced. It is considered that the reason is that although the lattice constant of the TiC phase is lowered to the above-mentioned range by adding TiOx, TiN, or the like, as compared with the case where an organization structure closer to TiC crystal without containing O, N, and the like in the TiC phase is formed, the sintering property is remarkably improved by he added TiOx or the like, and as a result, a dense sintered body is formed and the generation of micropores can be prevented. It is noted that O or N is not only supplied as an additive, but also supplied in such a way that O or N is substituted for part of C of the TiC phase from the sintering atmosphere. Also in such a case, the sintering property can be improved.

However, it was found that in the case where the amount of O or N supplied from the additive or the sintering atmosphere was too much and the lattice constant of the TiC constant after the sintering was lower than 4.317 Å, the micropores may easily be generated actually. It is considered that the reason is that when the TiC phase took in O or N, the substituted C is exhausted as Co gas, for example, during the sintering steps, and when the amount is large, gas remains in the sintered body, so that micropores are formed.

Accordingly, in the case where the content of O or N in the TiC phase in the AlTiC substrate is in a specific range, and the lattice constant of the TiC phase after sintering is in the range of 4.317 Å to 4.325 Å, the generation of micropores can be suppressed. In the case of less micropores, the condition with less variation in surface roughness can be maintained after forming ABS on the surface of the AlTiC substrate by dry etching process such as ion beam etching or ion milling, so that the possibility that any strange particle is caught in a particle pocket (a gap into which a particle is caught) and the HDD is crushed can decrease when using.

From the viewpoint of reducing the micropores, the lattice constant of the TiC phase is preferably 4.317 Å or more and 4.325 Å or less, more preferably 4.318 Å or more and 4.325 Å or less, and much more preferably 4.320 Å or more and 4.325 Å or less.

It was confirmed that in the case where the c-axis lattice constant of the $Al_2O_3$ phase was 12.992 Å or more and 12.998 Å or less, and the lattice constant of the TiC phase was 4.317 Å or more and 4.325 Å or less, the thermal conductivity was about 20 W/(m·k) to 26 W/(m·K), which was relatively high.

In such a case, the heat generated during the writing or reading operation is released externally via the AlTiC substrate relatively easily, so that the transducer which is caused to thermally expand during the operation due to TPTR does not come too much closer to the disk, so that it is possible to prevent the magnetic head from being damaged by the contact with the disk. In general, as a metal constituting a transducer, Fe, Co, Ni, Fe—Pt member or the like are mainly used. The coefficients of thermal expansion thereof are relatively two or three times as large as that of the AlTiC substrate. For this reason, the transducer may easily expansion due to the heat generated during the operation, but by using an AlTiC substrate in which the c-axis lattice constant of the $Al_2O_3$ phase and the lattice constant of the TiC phase are in the above-mentioned ranges, the discharge characteristics of the slider can be improved, and the occurrence of defect due to TPTR can be effectively suppressed.

It was found that especially in the case where the c-axis lattice constant of the $Al_2O_3$ phase was 12.992 Å or more and 12.995 Å or less, and the lattice constant of the TiC was 4.320 Å or more and 4.325 Å or less, the thermal conductivity was 23 W/(m·K) to 26 W/(m·K), so that heat could easily be escaped from the transducer during the operation, thereby effectively suppressing the occurrence of defect due to TPTR.

The number of generated micropores was examined. It was confirmed by the inventors of the present invention that, in the case where the lattice constant of the TiC phase was in the range of 4.317 Å or more and 4.325 Å or less as described above, the number was $0/900\,\mu m^2$ even when the c-axis lattice constant of the $Al_2O_3$ phase was 12.991 Å which was smaller than the above-mentioned range (and the lattice constant of the TiC phase was 4.317 Å and 4.325 Å), and the number was $0/900\,\mu m^2$ even when the c-axis lattice constant was 12.999 Å which was larger than the above-mentioned range (the lattice constant of the TiC phase was 4.322 Å). Accordingly, it was found that when the lattice constant of the TiC phase was 4.317 Å or more and 4.325 Å or less, the generation of micropores could be effectively suppressed in the wider range of the c-axis lattice constant of the $Al_2O_3$ phase of 12.991 Å or more and 12.999 Å or less.

In the case where the lattice constant of the $Al_2O_3$ phase is relatively large, the cutting workability is improved, thereby increasing the productivity. It is considered that the reason is that a sintered body of the AlTiC substrate containing relatively large amount of elements other than Al nor O is manufactured, and strains are generated in the alumina phase, so that cracks may easily be progressed, and as a result, the cutting workability is promoted. By the experiments of the inventors of the present invention, it was found that if the c-axis lattice constant of the $Al_2O_3$ is 12.992 Å or more, the cutting workability was improved as compared with the case where the lattice constant was less than 12.992 Å. Therefore, if the c-axis lattice constant of the $Al_2O_3$ phase is set to be 12.992 Å or more and 12.998 Å or less, and the lattice constant of the TiC phase is 4.317 Å or more and 4.325 Å or less, for example, the generation of micropores can be suppressed while improving the productivity.

Herein the cutting workability indicates the easiness of cutting work when the AlTiC substrate is cut into row bars or chips. The cutting workability can be, for example, evaluated by the number of cut bars or chips which can be cut until the resistance value in the cutting reaches a predetermined value. The larger cutting number means the higher productivity.

As described above, in the substrate for the thin-film magnetic head of this embodiment, the lattice constant of the TiC phase in the AlTiC substrate is set to be 4.317 Å or more and 4.325 Å or less. Herein the TiC phase may have composition ratios from $TiC_{0.5}$ to $TiC_{1.0}$. As the amount of C with respect to Ti is reduced, the lattice constant of the TiC phase to be formed tends to be lowered. If O (oxygen) and/or N (nitrogen) is substituted for part of C of the TiC phase, the lattice constant is lowered. It is noted that, in the material powder having the composition ratio closer to the stoichiometric ratio (TiC material powder which can be practically available and of which the atomic ratio of C to Ti is about 0.95), the lattice constant is approximately from 4.327 Å or more to 4.330 Å or less.

In order to set the lattice constant of the TiC phase in the AlTiC substrate in the range of 4.317 Å or more and 4.325 Å or less, for example, a material powder of which the atomic ratio of C to Ti is less than 1.0 and which has the atomic ratio in a predetermined range may be selected. Alternatively, the amount of $TiO_2$ (or TiOx (x is 0.5 or more and less than 1), $Ti_2O_3$, $Ti_2O_5$ and the like) or TiN used as an additive is regulated, thereby setting the lattice constant of TiC phase in an appropriate range. In addition, by appropriately regulating the oxygen partial pressure and the nitrogen partial pressure in the sintering atmosphere, it is possible to adjust the lattice constant of the TiC phase.

Herein the above-mentioned range of 4.317 Å or more and 4.325 Å or less is a range relatively closer to the lattice constant in the TiC phase which is close to the stoichiometric ratio (approximately 4.327 Å to 4.330 Å). In order to set the lattice constant of the TiC phase in such a range in the AlTiC phase, for example, TiC material powder of which the atomic ratio of C to Ti is relatively large may be used. Specifically, material powder of about $TiC_{0.85}$ to $TiC_{0.95}$ may be used. Also the amount of an additive such as $TiO_2$ system, TiN, or the like may be reduced (for example, with respect to the total mass 100% of TiC powder and the additive, the additive is 2.8 to 14 mass %). Alternatively, a method in which the amount of oxygen taken from water, air, or the like is reduced in the steps of mixing, crushing, drying, or granulation of material powders, or a method in which the nitrogen amount and the oxygen amount are reduced by setting the partial pressure of $N_2$ and the partial pressure of $O_2$ in the sintering atmosphere in the range of 13 kPa to 90 kPa may be used.

The thermal conductivity and the cutting workability can be controlled by setting the ratio between the $Al_2O_3$ phase and the TiC phase in the sintered body within a predetermined range. Specifically, by making the ratio of the $Al_2O_3$ phase to be relatively small, the thermal conductivity can be further reduced. In addition, by making the ratio of the TiC phase to be relatively large, the cutting workability can be improved.

In this embodiment, in order to effectively prevent the TPTR and also to improve the cutting workability, it is sufficient that the ratio between the alumina phase and the TiC phase after sintering be in an appropriate range. For this purpose, in the stage of the mixed powder for sintering, such a mass ratio is preferred that the total amount of the material powder used for forming the TiC phase (for example, TiC powder and $TiO_2$ powder) is 25 to 50 mass % of the total, and the balance is made up of the material powder for forming the alumina phase (for example, alumina powder). In more preferred mass ratio, the total amount of the material powder for forming the TiC phase is 30 to 50 mass % of the total of the mixed powder.

In order to form ABS on the obtained AlTiC substrate, dry etching such as ion milling or ion beam etching is performed. It was confirmed that, in the case where the c-axis lattice constant of the $Al_2O_3$ phase was 12.992 Å or more and 12.998 Å or less, and the lattice constant of TiC phase was 4.317 Å or more and 4.325 Å or less, a phase with a different etching rate was hardly generated and the degradation of surface roughness after dry etching could be prevented.

Hereinafter the production method of the AlTiC substrate in the embodiment according to the present invention will be described.

First, alumina powder, TiC powder, and $TiO_2$ powder are prepared as material powders. The respective material powders are ground so as to have desired average particle sizes by using a ball mill or the like. For example, respective average particle size of the alumina powder, the TiC powder, and the $TiO_2$ powder are 0.2 to 0.6 µm, 0.02 to 1.0 µm, and 0.02 to 0.2 µm. In this specification, the term "average particle size" means the d50 average particle size (median diameter at 50% in the cumulative distribution) obtained by laser diffraction.

Alternatively, the grinding step is not performed individually for each powder, but the mixing and the grinding may be performed simultaneously. The mixing and grinding step can be performed by using a vibration mill, a colloid mill, an Attritor, a high speed mixer, or the like, instead of the ball mill.

In order to increase the lattice constant of the TiC phase after sintering, it is preferred to decrease the amount of oxygen to be taken in the material powder of TiC. However, in the mixing and grinding process, the grinding of TiC phase is progressed and the surface oxidization progresses, as the number of rotations of the mill to be used is higher and the grinding period is expanded. Accordingly, in order to reduce the oxygen amount contained in the TiC material powder, it is preferred to make the revolution number of the mill to be not too high, and to make the time period for grinding to be too long. Accordingly, the oxygen amount introduced by the surface oxidation of the TiC material powder can be reduced, and the oxygen dissolved in the TiC crystal lattice during the sintering is reduced, so that it is possible to prevent the lattice constant in the TiC phase after the sintering from decreasing.

The reason why the average particle size of the alumina powder is set in the range of 0.2 µm to 0.6 µm is that if it is less than 0.2 µm, the formability is degraded, so that there is a possibility that the sintering step may not appropriately be performed. In addition, if the average particle size thereof exceeds 0.6 µm, the densification of the sintered body is not sufficient, so that there is a possibility that the strength may be insufficient.

The reason why the average particle size of the TiC powder is set in the range of 0.02 µm to 1.0 µm is that if it is less than 0.02 µm, the formability is liable to be degraded, so that there is a possibility that the sintering step may not appropriately be performed. In addition, if the average particle size thereof exceeds 1.0 µm, the sintering property is degraded, so that there is a possibility that a dense sintered body may not be obtained.

Next, the respective powders are mixed at a predetermined ratio, and a slurry is formed by wet milling, for example. The slurry is dried, thereby obtaining mixed powder for sintering. Herein in the mixed powder for sintering, when the total mass of the $Al_2O_3$ powder, the TiC powder, and $TiO_2$ powder is regarded as 100 mass %, the mass % of the $Al_2O_3$ powder is 50 mass % or more and 75 mass % or less, for example. The total mass % of the TiC powder and the $TiO_2$ powder is 25 mass % or more and 50 mass % or less, for example. If the total mass of the TiC powder and the $TiO_2$ powder is regarded as 100 pts. mass, the mass ratio of the TiC powder is 90 pts. mass or more and 97.2 pts. mass or less, for example. The mass ratio of the $TiO_2$ powder is 2.8 pts. mass or more and 10 pts. mass or less, for example.

In the case where a powder material for forming the TiC phase after sintering (for example, TiN powder) is used in addition to the above-mentioned TiC powder and the $TiO_2$ powder, the total mass of the powder material for forming the TiC phase may be in the range of 25 mass % or more and 50 mass % or less with respect to 100 mass % as the total with the $Al_2O_3$ powder.

In the above-described mixing step, MgO, $Y_2O_3$, or the like used as a sintering aid may be added. The amount of these sintering aid can affect the c-axis lattice constant of the alumina phase after the sintering. In this embodiment, the addition amount may be 500 ppm to 1000 ppm or less, or alternatively be 500 ppm to 700 ppm with the content other than sintering aids as 100 mass %, for example.

Next, by using a spray dryer, a compression granulator, an extrusion granulator, or the like, the mixed powder for sintering is granulated. Then the granulated mixed powder for sintering is compacted with a die, thereby obtaining a compact (pressurized powder body). Alternatively, the granulated mixed powder for sintering may be molded by utilizing dry pressure molding or cold isostatic hydro-pressure molding, thereby obtaining a compact.

The compact is subjected to, for example, hot-press sintering, or normal pressure sintering or atmospheric pressure sintering in non-oxidative atmosphere, thereby obtaining an AlTiC substrate as a sintered body. In addition to these steps, hot isostatic pressing (HIP) process may be added.

In the case of using a hot pressing apparatus, it is sufficient that the pressure sintering may be performed, for example, in an atmosphere of argon, helium, neon, nitrogen, vacuum, or the like, at a temperature of 1400° C. or more and 1800° C. or less. The reason why the sintering temperature is set to be 1400° C. or more and 1800° C. or less is that if the temperature is lower than 1400° C., there is a possibility that the sintering may not be sufficiently performed. If the temperature exceeds 1800° C., the grains of alumina crystals and TiC crystals are remarkably grown, so that there is a possibility that the mechanical characteristics may be largely deteriorated in addition to the possibility that the surface roughness after the working cannot be decreased.

In this sintering step, in order to set the lattice constant of the TiC phase formed after sintering in the range of 4.317 Å or more and 4.325 Å or less, the $N_2$ partial pressure or the $O_2$ partial pressure in the sintering atmosphere in the range of 13 kPa to 90 kPa, thereby reducing the nitrogen amount or the oxygen amount taken into the sintered body.

When pressure sintering is performed, a dense sintered body is manufactured, and an AlTiC substrate with good strength can be obtained. After the pressure sintering step is performed as descried above, hot isostatic pressure (HIP) sintering may be additionally performed. For example, when the hot isostatic pressure sintering is performed by applying a pressure of 150 MPa or more and 200 MPa or less at a temperature of 1350° C. or more and 1700° C. or less, the flexural strength can be 700 MPa or more. Especially, in order to reduce the number of micropores, the HIP sintering may be performed at a temperature of 1500° C. or more and 1700° C. or less.

For the substrate surface of the thus-obtained AlTiC substrate, a plurality of devices, insulating films (such as an Al$_2$O$_3$ film) are formed via a known thin film depositing process. In addition, as shown in FIG. 2B, the AlTiC substrate 21 on which the transducer 23 is formed is cut into bars (row-bars) by using a dicing saw or the like, and then the cut surface (a side face perpendicular to the face on which the transducer 23 is formed) is subjected to lapping, thereby regulating the thickness and forming a smooth surface. In addition, by ion milling or the like, ABS suitable for the air flow in the smoothed surface is formed, and cutting into chips is performed finally, thereby manufacturing a slider.

The ABS can be formed so as to have a desired shape by appropriately selecting processing conditions in the dry etching step such as ion milling or reactive ion etching. For example, in order to set the average roughness Ra of the ABS (in the present specification, it indicates an arithmetic average roughness Ra defined by Japanese Industrial Standard (JIS) Nos. JIS B 0601:1944 and JIS B 0031:1994) to be 25 nm or less, in the ion milling, it is sufficient that the ABS may be processed by setting the accelerating voltage to be 600 V, at a milling rate of 18 nm/minute with Ar ions for 75 to 125 minutes. In the reactive ion etching, it is sufficient that the ABS may be worked in the conditions where the flow rates of Ar gas and CF$_4$ gas are 3.4×10$^{-2}$ Pa·m$^3$/s and 1.7×10$^{-2}$ Pa·m$^3$/s, respectively, and the pressure of mixed gas is 0.4 Pa.

Hereinafter the embodiments of the present invention and comparative examples will be described.

Table 1 shows samples with different composition ratios (mass %) of alumina powder, TiC powder, and TiO$_2$ powder as material powders, and different amounts of MgO powder as sintering aid (external pts. mass with total content of alumina powder, TiC powder, and TiO$_2$ powder as 100 pts. mass), as samples Nos. 1 to 16 of the embodiments according to the present invention, and samples Nos. 101 to 111 of comparative examples.

For respective samples, lattice constants in sintered bodies (c-axis lattice constants of alumina phase and lattice constants of TiC phase). In addition, as evaluation items, thermal conductivity (W/(m·K)), the number of generated micropres (pc.), and cutting workability (the number of bars). Herein the case where the thermal conductivity is 20 W/m·K) or more is treated as a slider with good TPTR characteristics. In addition, in the case where the number of micropores/900 μm$^2$ is 1 or less, the obtained AlTiC substrate is treated as one with suppressed micropores. In addition, a sample in which the cutting resistance in cutting is 0.4 kW or less and 30 bars can be obtained by the cutting is treated as a slider with superior cutting workability (productivity). As for a sample in which the cutting resistance reaches 0.4 kW before 30 bars are cut, the number of bars obtained at the time is shown in Table 1. It is noted that 30 bars indicate a standard dress (dressing) interval when the cutting is performed by using a dicing saw or the like. In the case where the number of cut bars does not reach 30, it is necessary to perform the dressing relatively frequently. Thus it is difficult to sufficiently improve the production rate.

TABLE 1

| Sample No. | Alumina material Lattice Constant (Å) | Material (Powder) Al$_2$O$_3$ (mass %) | TiC (mass %) | TiO$_2$ (mass %) | MgO (out mass %) | Lattice Constant (Å) of Sintered body Alumina phase | TiC phase | Thermal conductivity (W/m·K) | The number of Micropores (pc.) | Cutting workability (the number of bars) |
|---|---|---|---|---|---|---|---|---|---|---|
| 1 | 12.983 | 65.0 | 34.0 | 1.0 | 0.050 | 12.992 | 4.325 | 26 | 0 | 30 |
| 2 | 12.983 | 65.0 | 33.0 | 2.0 | 0.050 | 12.992 | 4.322 | 25 | 0 | 30 |
| 3 | 12.983 | 65.0 | 32.5 | 2.5 | 0.050 | 12.992 | 4.320 | 24 | 0 | 30 |
| 4 | 12.983 | 65.0 | 31.5 | 3.5 | 0.050 | 12.992 | 4.317 | 24 | 1 | 30 |
| 5 | 12.983 | 65.0 | 32.5 | 2.5 | 0.058 | 12.993 | 4.320 | 23 | 0 | 30 |
| 6 | 12.983 | 65.0 | 31.5 | 3.5 | 0.058 | 12.993 | 4.317 | 23 | 1 | 30 |
| 7 | 12.983 | 65.0 | 31.5 | 3.5 | 0.070 | 12.995 | 4.317 | 21 | 1 | 30 |
| 8 | 12.983 | 65.0 | 34.0 | 1.0 | 0.100 | 12.998 | 4.325 | 20 | 0 | 30 |
| 9 | 12.983 | 65.0 | 31.5 | 3.5 | 0.100 | 12.998 | 4.317 | 20 | 1 | 30 |
| 10 | 12.983 | 65.0 | 32.0 | 3.0 | 0.090 | 12.997 | 4.318 | 20 | 0 | 30 |
| 11 | 12.983 | 65.0 | 32.8 | 2.2 | 0.070 | 12.995 | 4.321 | 23 | 0 | 30 |
| 12 | 12.983 | 65.0 | 34.0 | 1.0 | 0.070 | 12.995 | 4.325 | 24 | 0 | 30 |
| 13 | 12.983 | 65.0 | 32.5 | 2.5 | 0.054 | 12.993 | 4.321 | 24 | 0 | 30 |
| 14 | 12.983 | 65.0 | 32.6 | 2.4 | 0.058 | 12.993 | 4.321 | 24 | 0 | 30 |
| 15 | 12.983 | 65.0 | 32.0 | 3.0 | 0.064 | 12.994 | 4.319 | 23 | 0 | 30 |
| 16 | 12.983 | 65.0 | 31.8 | 3.2 | 0.080 | 12.996 | 4.319 | 22 | 0 | 30 |
| Comparative 101 | 12.983 | 65.0 | 34.0 | 1.0 | 0.045 | 12.991 | 4.325 | 26 | 0 | 21 |
| Comparative 102 | 12.983 | 65.0 | 32.0 | 3.0 | 0.045 | 12.991 | 4.318 | 25 | 0 | 26 |
| Comparative 103 | 12.983 | 65.0 | 34.5 | 0.5 | 0.050 | 12.992 | 4.328 | 27 | 2 | 20 |
| Comparative 104 | 12.983 | 65.0 | 30.5 | 4.5 | 0.050 | 12.992 | 4.315 | 24 | 2 | 30 |
| Comparative 105 | 12.983 | 65.0 | 29.0 | 6.0 | 0.070 | 12.995 | 4.312 | 19 | 3 | 30 |
| Comparative 106 | 12.983 | 65.0 | 30.5 | 4.5 | 0.100 | 12.998 | 4.315 | 19 | 2 | 30 |
| Comparative 107 | 12.983 | 65.0 | 33.8 | 1.2 | 0.130 | 12.999 | 4.324 | 19 | 1 | 30 |
| Comparative 108 | 12.983 | 65.0 | 33.0 | 2.0 | 0.130 | 12.999 | 4.322 | 19 | 0 | 30 |
| Comparative 109 | 12.983 | 65.0 | 34.2 | 0.8 | 0.090 | 12.997 | 4.326 | 22 | 2 | 30 |
| Comparative 110 | 12.983 | 65.0 | 34.2 | 0.8 | 0.070 | 12.995 | 4.326 | 24 | 2 | 30 |
| Comparative 111 | 12.983 | 65.0 | 30.0 | 5.0 | 0.070 | 12.995 | 4.314 | 19 | 2 | 30 |

The examples Nos. 1 to 16, and the comparative examples Nos. 101 to 111 utilized alumina material powder which was closer to α-alumina having a corundum structure and of which the c-axis lattice constant was 12.983 Å. The alumina material powder having such a lattice constant may contain Na, Mg, Ca, or the like of about 10 to 800 ppm as impurity. It is noted that depending on the addition amount of MgO which is added as a sintering aid, as shown in Table 1, the c-axis lattice constant of the alumina phase in the sintered body (the AlTiC substrate) varies.

The lattice constants in the respective samples of various compositions were measured by the following method. Specifically, 10 test pieces each having the size of about 30 Mm×30 mm×1 mm are cut out from each sample. Each cut-out test piece is irradiated with Cu-target K-characteristic X-ray with tube voltage of 45 kV and tube current of 40 mA. In the range of diffraction angle of 2θ=20° to 80°, X-ray diffraction patterns obtained by the scanning of the step size of 0.017° and at the scan speed of 0.42°/sec are analyzed by using Rietveld analysis program of X'Pert High Score Plus by PANalytical, thereby obtaining lattice constants of the $Al_2O_3$ phase and the TiC phase. If necessary, for the obtained X-ray diffraction pattern, data processing such as Kα separation, background subtraction, or smoothing may be performed. By this method, measurement is performed at arbitrary ten points of each cut-out test piece, and an averaged value of 10 test pieces×10 points is calculated, thereby obtaining a lattice constant of respective sample.

As for the number of micropores, when there was a cavity portion having a size of ϕ0.2 μm or more in an image of 900 μm² (30 μm×30 μm) obtained by an atomic force microscope (AFM), the number of cavity portions was counted. The number was regarded as the number of micropores.

Figure 4:
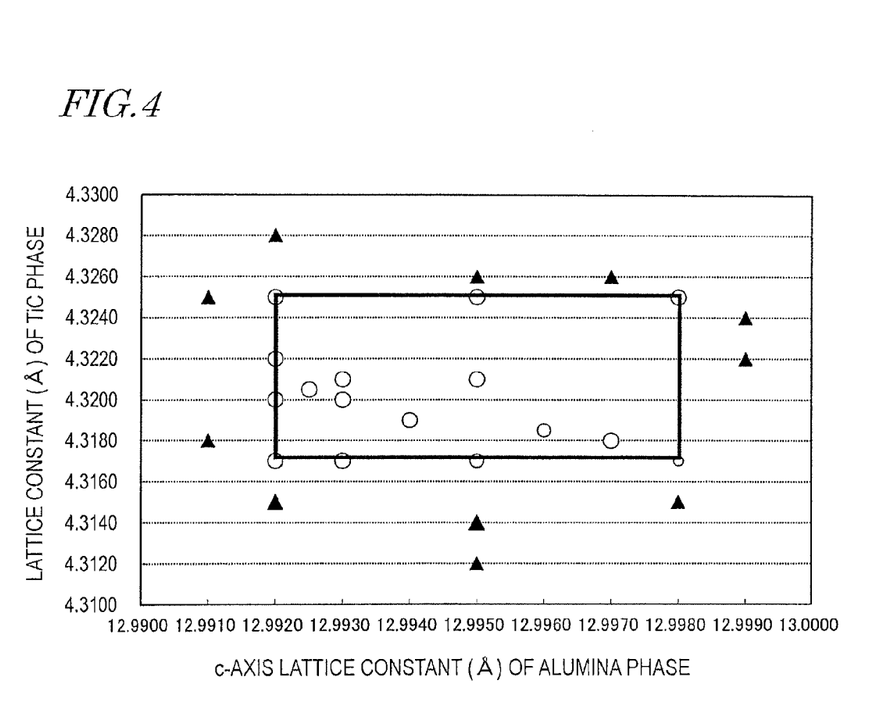
FIG. 4 is a diagram showing the distribution of embodiments of the present invention and comparative examples in which the c-axis lattice constants of the $Al_2O_3$ phase and the lattice constants of the TiC phase are different.

FIG. 4 shows the distribution of c-axis lattice constants of alumina phase and lattice constants of TiC phase for respective samples. In FIG. 4, the horizontal axis indicates the c-axis lattice constant of the alumina phase, and the vertical axis indicates the lattice constant of the TiC phase.

As known from Table 1 and FIG. 4, in the embodiments of the samples Nos. 1 to 16 in which the c-axis lattice constants of the alumina phases were in the range of 12.992 Å or more and 12.998 Å or less, and the c-axis lattice constants of the TiC phases were in the range of 4.317 Å or more and 4.325 Å or less, it was confirmed that the thermal conductivity was relatively high and the generation of micropores could be suitably suppressed. Accordingly, the occurrence of defect due to TPTR can be effectively prevented, and smooth ABS can be formed. In addition, in the embodiments, it was confirmed that the cutting workability was superior, and it was possible to improve the productivity.

Although not shown in Table 1, in the samples No. 1 to No. 16, it was confirmed that a phase with a different etching rate (the third phase) other than the alumina phase and the TiC phase was not generated in the sintered body, and it was possible to prevent the degradation of surface roughness after the dry etching for forming the ABS.

It was found that especially in the case where the lattice constant of the TiC phase was in the range of 4.318 Å or more and 4.325 Å or less, the number of micropores was 0/900 μm², which was suitable for improving the smoothness of the ABS.

Moreover, it was found that especially in the case where the c-axis lattice constant of the $Al_2O_3$ phase was 12.992 Å or more and 12.995 Å or less, and the lattice constant of the TiC phase was 4.320 Å or more and 4.325 Å or less, the thermal conductivity could be suitably improved.

In the above description, the substrate for a thin-film magnetic head in the embodiment according to the present invention has been described. In addition, a hard disk drive device can be manufactured by a known method with a magnetic head slider manufactured by using the above-described substrate for the magnetic head.

Figure 5:
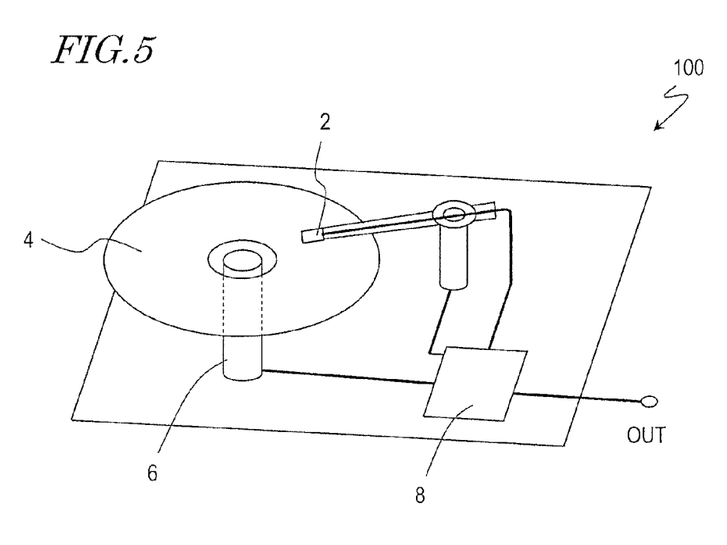
FIG. 5 is a schematic perspective view showing the configuration of a hard disk drive device in one embodiment of the present invention.

As shown in FIG. 5, a hard disk drive device 100 in an embodiment of the present invention includes, for example, a magnetic head slider 2 having the above-described configuration, a magnetic disk (a platter) 4, a motor 6 for causing the magnetic disk 4 to rotate, a controller 8 configured to control the positioning of the magnetic head slider 2 with respect to the magnetic disk 4 and control the writing/reading operation by the magnetic head slider 2, and the like. The controller 8 may be configured so that the head slider 2 is moved to a specific position on the platter 4 in response to the reading/writing signal from the external. In the hard disk drive device, it is possible to realize the recording with high recording density during the writing/reading operation.

The $Al_2O_3$—TiC based substrate for a thin-film magnetic head according to the embodiments of the present invention can be suitably used in a hard disk drive which realizes high recording density.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

This application is based on Japanese Patent Application No. 2014-134420 filed on Jun. 30, 2014, the entire contents of which are hereby incorporated by reference.

What is claimed is:

1. An $Al_2O_3$—TiC based substrate for a thin-film magnetic head including an $Al_2O_3$ phase and a TiC phase, wherein a c-axis lattice constant of the $Al_2O_3$ phase is 12.992 Å or more and 12.998 Å or less, and a lattice constant of the TiC phase is 4.317 Å or more and 4.325 Å or less.

2. The $Al_2O_3$—TiC based substrate for a thin-film magnetic head according to claim 1, wherein the lattice constant of the TiC phase is 4.318 Å or more and 4.325 Å or less.

3. The $Al_2O_3$—TiC based substrate for a thin-film magnetic head according to claim 1, wherein the c-axis lattice constant of the $Al_2O_3$ phase is 12.992 Å or more and 12.995 Å or less, and the lattice constant of the TiC phase is 4.320 Å or more and 4.325 Å or less.

4. A magnetic head slider comprising the $Al_2O_3$—TiC based substrate for a thin-film magnetic head recited in claim 1.

5. A hard disk drive device comprising the magnetic head slider recited in claim 4.

* * * * *